United States Patent
Macquet et al.

(10) Patent No.: US 10,474,125 B2
(45) Date of Patent: Nov. 12, 2019

(54) METHOD FOR THE MANAGEMENT OF OPTIONAL FUNCTIONS IN A SCREW DRIVING SYSTEM, CORRESPONDING SYSTEM, CONTROL HUB AND COMPUTER PROGRAM PRODUCT

(71) Applicant: ETABLISSEMENTS GEORGES RENAULT, Saint Herblain (FR)

(72) Inventors: Laurent Macquet, La Chapelle sur Erdre (FR); Gatien Butstraen, Nantes (FR); Nicolas Bocquet, Saint Herblain (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 144 days.

(21) Appl. No.: 15/837,609

(22) Filed: Dec. 11, 2017

(65) Prior Publication Data

US 2018/0164776 A1 Jun. 14, 2018

(30) Foreign Application Priority Data

Dec. 9, 2016 (FR) ...................................... 16 62262

(51) Int. Cl.
  *G05B 19/402* (2006.01)
  *G05B 19/418* (2006.01)
  *G06F 21/10* (2013.01)

(52) U.S. Cl.
  CPC ..... *G05B 19/402* (2013.01); *G05B 19/41835* (2013.01); *G06F 21/105* (2013.01); *G05B 2219/36542* (2013.01); *G05B 2219/40072* (2013.01); *G05B 2219/45203* (2013.01); *Y02P 90/12* (2015.11)

(58) Field of Classification Search
  None
  See application file for complete search history.

(56) References Cited

U.S. PATENT DOCUMENTS

2011/0296402 A1  12/2011  Heyman et al.

FOREIGN PATENT DOCUMENTS

EP     3032447 A1     6/2016

OTHER PUBLICATIONS

French Search Report dated Aug. 8, 2017 for corresponding French Application No. 1662262, filed Dec. 9, 2016.

*Primary Examiner* — Thomas S McCormack
(74) *Attorney, Agent, or Firm* — David D. Brush; Westman, Chanplin & Koehler, P.A.

(57) ABSTRACT

A method is provided for managing optional functions in a screw driving system using a fleet of at least two control hubs, each controlling at least one piece of production equipment and being capable of being used with at least one optional function. Each control hub stores non-differentiated tokens. The optional function is assigned a pre-defined weight, corresponding to a number of tokens. The optional function is pre-installed and deactivated in the control hub. The optional function can be selectively activated on the control hub if the control hub has available a number of tokens greater than the weight of the function, a quantity of tokens corresponding to the weight being debited from the number of tokens available to the control hub, and the function can be selectively deactivated. The quantity of tokens are then made freely usable. Two control hubs can transfer non-differentiated tokens to each other.

17 Claims, 4 Drawing Sheets

METHOD FOR THE MANAGEMENT OF OPTIONAL FUNCTIONS IN A SCREW DRIVING SYSTEM, CORRESPONDING SYSTEM, CONTROL HUB AND COMPUTER PROGRAM PRODUCT

1. FIELD OF THE INVENTION

The field of the invention is that of industrial tooling systems and especially screw driving, designed especially for the equipment of factory plants or production lines, for example in the field of motor vehicles automobiles or aeronautics.

More specifically, an exemplary embodiment of the invention relates to the optimizing of the use and control of these tooling systems, especially screwdrivers, to adapt them to the requirements of users by means of optional functions.

2. PRIOR ART

The context of an exemplary embodiment of the invention especially is that of the production of motor vehicles. Factory plants dedicated to this type of production integrate assembly lines in which the vehicles or parts of vehicles are moved through work stations, each of these stations being designed for the mounting of a component to gradually build a full vehicle.

Each work station comprises tools that are specific and necessary for the mounting of the component which it is responsible for assembling or transforming. These tools may especially be screwdrivers used to tighten screws.

Besides, the ever-increasing requirements of productivity and quality have pushed towards greater sophistication in screwdriver systems.

These screwdrivers systems are structurally constituted by:
  a screwdriver for driving screws; this screwdriver can be carried by an operator or fixed to an automated structure or again it can be powered by a cable or a battery; and
  a controller, which depending on production requirements, authorizes the screwdriver to work with predetermined production parameters and/or collects the results of screw driving generated by the screwdriver and transmits them to a quality recording system of the factory plant. For a cable-powered screwdriver, the controller integrates the power supply of this screwdriver.

The development of screwdrivers has led to the development of controllers which, on the one hand, are more compact because they do not have a power supply and, on the other hand, have the capacity to control several screwdrivers by radio means. These controllers are called "stations".

There are also plans for future virtual controllers, for example in the form of industrial computers supporting the screwdriver-control program.

This type of means, controllers, stations or virtual controllers are called "control hubs" here below in the description.

In another approach, the control hub (or concentrator) may be integrated into the screwdriver and communicate with the network by radio means and/or through an access point connected to the network.

These control hubs or concentrators are connected, by means of the computer network of the plant, for example of an Ethernet type, to a managing system of the functioning of the production line. This system can be an industrial automaton, a server or again a computer. This system is called a "manager" here below in the description.

In the case of production means less structured than motor-vehicle assembly lines, it can happen that the screw driving system is not connected to a computer system. Depending on production demands, it could however be put into communication by an operator with an information transfer means. These means could for example consist of a memory card that can be connected to the control hub or communicate with it by short-distance ratio means, for example NFC type means, or again a tablet or a laptop computer connected by wire or radio means.

Thus, a "manager" can transfer information or commands to a group of one or more control hubs and receive information from such a group of one or more hubs. If necessary, several managers can be linked to several groups of control hubs.

Here below, the term "production equipment" or "production facility" shall designate an element in charge of an action in the context of a production line where it can be, especially, a fixed or portable screwdriver, an accessory linked to this screwdriver, for example a barcode reader or a positioning transponder or an accessory connected to the control hub directly or by means of the screwdriver, for example a printer or a socket receptacle.

A control hub enables the distribution of commands to production equipment and the recovery or transfer of information on operations performed by this equipment towards the "managers".

It is known that production equipment is presently very precise and that it is possible especially to control different aspects of screw driving (for example speed, angle, torque value etc.) of scr. It is also possible to control synchronization between several pieces of equipment. It is also possible to check whether the selected accessory is the right one and/or whether the tool is acting on the right screw. Besides, production tools are capable of providing information on the operation conducted enabling quality controls and controls on traceability. These pieces of data can be stored by the manager.

The work stations mentioned further above can have special requirements depending on the assembling operation to be performed therein. To meet these requirements, special software functions are implemented, constituting software options which may or may not be acquired and managed by the operating practices department of a company.

It can also happen that a production line must evolve according to a change in the vehicle to be produced. In this case, the screw driving means, including their software options, must be capable of being redistributed on an assembly line according to production requirements.

Thus, the production equipment and the control hubs have, or can have, a great number of functions that the manufacturer places at the disposal of users.

Not all these functions, however, are necessary for all uses. Nor are they used permanently. The manufacturers therefore sometimes propose the possibility of making these functions optionally available at the request of the users.

There are two known approaches today for making functions available to the user:
  a first approach provides for the use of a memory card that can be connected to the control hub, or an electronic key or stick, carrying a memory and containing a batch of programs of authorized functions and having to be permanently connected to the control hub. The customer purchases the memory card or stick containing the function that he needs and can then use it. One major drawback of this approach is that the customer sometimes also pays for functions that he does not need. In addition, if a new function is required and if it is not present in the batch in the memory card or stick being used, he must purchase a new memory card and replace the previous one. In addition, the functions that are not used in the memory card cannot be used in another control hub, since they are confined to the memory card and since this sort of memory card must remain on the control hub. Finally, controlling a new memory card or stick to obtain a new function may take time and thus penalize production;

a second approach may consist in the purchasing of the function in the form of an activation code to be entered into the control hub, thus unblocking a function that has been pre-installed in the control hub. The drawback is that this function too is confined to the control hub in which it has been installed and cannot be transferred to another control hub. In the event of a malfunction in the control hub, the use of the function cannot be retrieved because the activation of this function is valid only for the control hub in which it has been installed.

There is therefore a major need for a novel approach to providing access to different optional functions available for a screw driving system that can be implemented more simply and speedily (if possible almost instantaneously) and can easily be checked by the user.

3. SUMMARY

These characteristics are obtained by means of a method for managing optional functions in a screw driving system using a fleet of at least two control hubs each controlling at least one piece of production equipment and capable of being used with at least one optional function.

According to an exemplary embodiment of the invention, each of said control hubs stores non-differentiated tokens and said at least one optional function is assigned a pre-defined weight, corresponding to a number of tokens, said at least one optional function being pre-installed and deactivated in said control hub. Said at least one function can be selectively activated on said control hub provided that the control hub has available a number of tokens greater than the weight of said function, a quantity of tokens corresponding to the weight of said function being debited from said number of tokens available to the control hub, and being selectively deactivated, said tokens corresponding to the weight of said function being then made freely usable. Two of said control hubs can transfer non-differentiated tokens to each other.

Thus, according to an exemplary embodiment of the invention, the management of the function is particularly simple and enables the immediate positioning and removal of functions from a control hub, especially because two control hubs can directly or indirectly transfer tokens to each other, if necessary without going through any centralizing or control intermediaries to adapt to an immediate need of a piece of production equipment, such as a screwdriver needing a programming or a sequencing of a specific screw driving operation.

These optional functions can be present, but not activated, in the control hubs. They therefore do not need to be downloaded or installed or, possibly, have their parameters set when they are needed. It is enough to activate them or to unblock them by allocating the required number of tokens.

This approach is particularly efficient and adapted to factory plants and production lines, which generally have high requirements in terms of reaction speed and for which the classic license-managing techniques are not acceptable and can lead to major losses, for example if a screwdriver cannot be used for several hours or days because a function is unavailable.

This approach furthermore enables very speedy action by an operator, locally, between two control hubs, without any need to refer to a central controller.

According to one particular embodiment, at least one device for managing said fleet of control hubs has available a first storage memory capable of storing non-differentiated tokens and each of the control hubs is associated with a second memory for the storage of tokens capable of exchanging tokens, on the one hand, with said first electronic memory and, on the other hand, with said second memory of another control hub.

The control hubs are thus equipped with control means for controlling exchanges of tokens, capable to communicating with a manager, but also directly with another control hub, independently of the manager, for a direct exchange of tokens.

Said manager can especially belong to the group comprising:
  industrial automatons;
  servers;
  computers;
  memory cards;
  tablets;
  USB sticks;
  control hubs.

An exemplary embodiment of the invention especially relates to the use of screwdrivers, said functions especially comprising functions for the programming and/or sequencing of a screw driving operation.

More generally, said functions can especially belong to the group comprising:
  the activation of at least one production facility;
  screw driving strategies defining a sequencing of steps, each defined by a value of torque, a speed and/or a screw driving angle;
  the maximum numbers of steps for a screw driving strategy;
  the maximum number of screw driving strategies available;
  at least one sequencing of a set of screw driving operations;
  at least one screw driving synchronization between at least two screw driving tools;
  the operations of traceability of a screw driving operation and/or a set of screw driving operations;
  the operations of analysis and/or control of a screw driving operation and/or a set of screw driving operations;
  the modifications of the capacity of memory storage;
  the customizing of a specific communications protocol.

According to one particular embodiment, said control hub has a man/machine interface enabling the activation of said functions by an operator.

The operator can therefore take direct action, via the control hub (independently of a manager), to activate a function and if necessary to arbitrate on the assignment of tokens and/or the exchange of tokens with another control hub or manager.

According to one particular embodiment, said control hub enables the activation of one of said functions by said manager.

Thus, the manager or the control hub can act on the activation of a function, respectively in a decentralized or a centralized way. If necessary, it can be planned that certain functions will be activated solely by a manager or a control hub.

According to different embodiments, said transfer of tokens is done between at least one manager carrying said first electronic memory and at least one control hub carrying said second electronic memory, using a wire, radio and/or contactless link.

According to one embodiment, said second memory associated with a given control hub is detachable, so that it can be mounted on a replacement control hub in the event of malfunction or failure of said given control hub.

Again, this enables almost immediate action by an operator without calling upon a centralized system and without any difficulty related to the assignment of a function to a specifically identified element.

According to one particular embodiment, each of said tokens has an expiry date and/or a maximum duration of use beyond which it becomes of no value.

Similarly, each of said tokens can bear a transfer-locking date and/or a maximum number of transfers beyond which it can no longer be transferred, on the one hand from a second control hub memory towards said first memory and/or on the other hand towards said second memory of another control hub.

This enables the simple management of the updating and renewal of tokens. Naturally, an alert mechanism can be planned, at a pre-determined period of time before the final date, so that the operator or the manager can verify that he has replacement tokens and so that he can procure new tokens if need be.

According to one particular embodiment of the invention, a step is planned for the storage, in a centralized management unit, of a table for assigning said tokens to each of said control hubs and/or to each of said functions and/or for assigning an availability of tokens in each of said control hubs.

This makes it possible to generally track the assignments as well as the expiry dates of the tokens, manage the store of these tokens and rebuild the distribution of the functions in case of failure or destruction of one or more elements of the system.

An exemplary embodiment of the invention also relates to a screw driving system implementing the method described here above. In such a system, each of said control hubs stores non-differentiated tokens and said at least one optional function is assigned a pre-defined weight corresponding to a number of tokens, said at least one optional function being pre-installed and deactivated in said control hub, said at least one function being capable of being selectively activated on said control hub provided that the control hub has available a number of tokens greater than the weight of said function, the tokens corresponding to the weight of said function being debited from the number of tokens available to the control hub, and being capable of being selectively deactivated, said tokens corresponding to the weight of said function being then made freely usable, and two of said control hubs being able to transfer said tokens to each other.

An exemplary embodiment of the invention also relates to a control hub of such a screw driving system comprising means for activating/deactivating said optional functions, these operations crediting or debiting said second storage memory with tokens.

According to one particular embodiment of the invention, such a control hub is associated with a second memory for the storage of tokens and it comprises means for managing tokens capable of exchanging tokens on the one hand with a first electronic memory of a manager device of said fleet of control hubs and on the other hand with said second memory of another control hub.

An exemplary embodiment of the invention also relates to a computer program product comprising program code instructions to implement the methods described here above, when said program is executed on a computer, as well as a computer-readable and non-transient storage medium storing such a computer program product.

4. LIST OF FIGURES

Other features and advantages of the invention shall appear more clearly from the following description of an embodiment, given by way of a simple illustratory and non-exhaustive example, and from the appended figures of which.

5. DESCRIPTION OF ONE EMBODIMENT OF THE INVENTION 5.1 Example of a System Implementing an Exemplary Embodiment of the Invention An exemplary embodiment of the invention can therefore be applied to the optimized implementing of a set of electric tools, especially screwdrivers, for example in the production line (or as the case may be several production lines).

Figure 1:
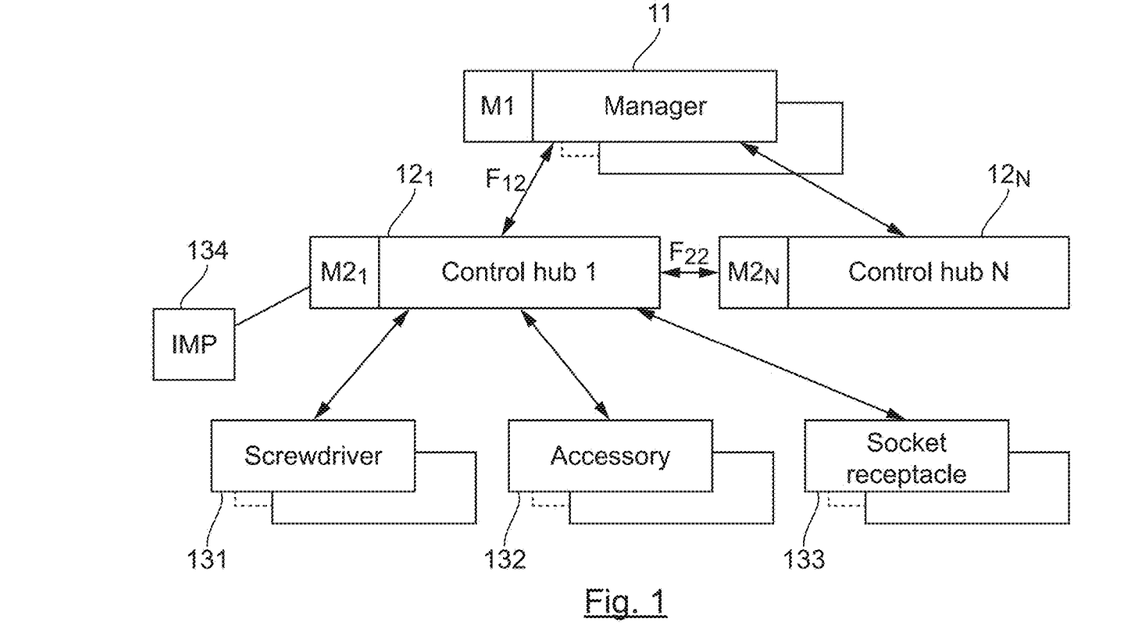
FIG. 1 schematically illustrates a system in which the method of an exemplary embodiment of invention can be used.

As illustrated in FIG. 1 schematically, the production line is associated with a manager 11 which can especially be a server, a computer or an automaton, or even a device equipped with a memory and data exchange means.

This manager 11 can for example be a centralized means controlling production and carrying out a storage of corresponding data, as well as if necessary the statistical operations of quality control and traceability. It can especially record the data given by the production facilities.

As the case may be, several managers can be present and can be connected to one another and exchange data.

The managers 11 can especially possess a storage memory M1 capable of storing tokens according to the mechanism that shall be described in greater detail here below.

The manager 11 is associated with several control hubs $12_1, \ldots, 12_N$ which are especially equipped with a memory $M2_1$ to $M2_N$ capable of storing tokens. The memories M1 and M2 are capable of storing and exchanging tokens according to an adapted and secured protocol.

The manager can communicate with the control hubs via wire, radio or contactless links. This is also the case for the connections between the control hubs.

Transaction-securing means and/or algorithms known to those skilled in the art can thus be implemented to ensure at least one of the following aspects:
- identifying and signing a token;
- uniqueness and validity of a transfer;
- counter-measures against fraud and the multiple copying and use of a token.

Each control hub 12 can control one or more pieces of production equipment such as a screwdriver 131 which may be fixed or portable, one or more accessories 132 linked to a screwdriver, for example a barcode reader or a positioning transponder, or again an accessory connected to the control hub 12, for example a printer 134 or a socket receptacle 133.

In one variant, the control hub can be integrated into the screwdriver.

The screw driving systems are capable of applying screw driving strategies or "procedures" to the screw to be tightened. These strategies are themselves defined by parameters of use.

The parameters of use are managed by the controller and define the functioning of the screwdriver during any work carried out by the operator. The controller is generally connected to a network internal to the production unit for the reception of screw driving procedures and other parameters needed for the efficient use of the tool at the workstation.

The parameters may be directly programmed by the controller or transmitted to the controller via computer networks dedicated to production management to which the controller is connected.

It is thus possible to adapt the screw driving procedure or strategy to the requirements defined by the research and design department that has designed the part to be assembled.

The adaptation for example relate to parameters such as:
- torque tightening;
- angle clamping;
- tightening to elastic limit of screw;
- tightening with detection of screw contact;
- etc.

Other functions can be used such as:
- the possibility of sequencing or scheduling the tightening operations including changes of strategy from one screw driving operation to another, and including intermediate actions etc.;
- the automatic feedback control of the screw driving system by a positioning system making it a condition that the screwdriver should be positioned on the right screw before permitting the screw driving operation with the appropriate strategies;
- making the operation of the screwdriver conditional upon the use and detection of the right screw driving accessories such as a socket;
- exporting the results of screw driving (torque, angle, current etc.) on computer networks dedicated to production management);
- the use of particular communications protocols.

5.2 Reminder of the General Principle of an Exemplary Embodiment of the Invention An exemplary embodiment of the invention therefore proposes a simple and efficient solution for the management of optional functions or production equipment or facilities and/or control hubs. These optional functions can especially belong to the following group:
- the activation of at least one production facility or piece of equipment;
- screw driving strategies defining a sequence of steps each defined by a value of torque, a speed and/or a screw driving angle;
- the maximum numbers of steps for a screw driving strategy;
- the maximum number of screw driving strategies available;
- at least one sequencing of a set of screw driving operations;
- at least one synchronization of screw driving between at least two screw driving tools;
- the operations of traceability of screw driving operation and/or a set of screw driving operations;
- the operations of analysis and/or control of a screw driving operation and/or a set of screw driving operations;
- the modifications of the memory storage capacity;
- the customizing of a specific communications protocol;
- the processing of the traceability data;
- making the performance and production quality indicators available;
- predictive maintenance.

According to an exemplary embodiment of the invention, each of these functions is embedded, i.e. present, in the equipment or control hub from the very outset (or if necessary through an updating operation) but it is not activated, by default. A predefined weight, or value, is assigned to each function in the form of a number of value units or tokens. Thus, the user simply knows the value of each function and can choose to activate it or not by allocating the required number of tokens to it. To this end, he must of course have a store of tokens available, stored in the memory M1 of the manager 11 or the control hub 12$_1$ or any other control hub and that he has first procured from the manufacturer.

These tokens are non-differentiated, i.e. they are not definitively assigned or associated either with the particular function or the type of function or with a particular control hub. The user himself, without external action, chooses the use that he will make of these tokens, i.e. their allocation and a given function and a possible reallocation, for example a screw driving strategy could be valued at five tokens whereas a traceability protocol could be valued at eight tokens.

Giving set values to the screw driving functions thus gives the user great flexibility of use. He has a number of tokens at his disposal that he can use as desired, to distribute them among several uses and on various equipment for which it is desirable to allocate tokens at a given point of time. It is indeed possible and easy to transfer tokens from one function to another and/or from one piece of equipment to another.

The manager 11 can manage an assignment table T1, associating for example with each control hub:
- a list of currently assigned functions;
- a number of tokens immobilized accordingly;
- a number of available tokens;
- etc.

This can especially enable, on the one hand, general tracking in real time and on the other hand a reconstruction in the event of failure of a control hub or of its memory for example.

Figure 2:
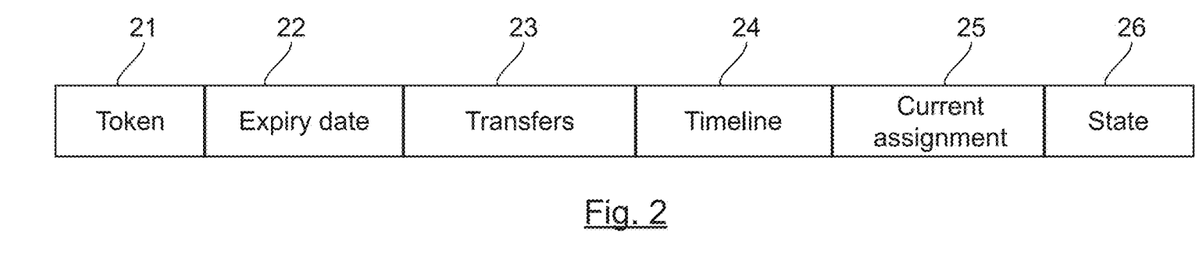
FIG. 2 schematically illustrates an example of a data structure of a token according to one embodiment of the invention.

FIG. 2 schematically illustrates the information structure of a token.

It comprises first of all a unique signature 21 that guarantees the origin of the token and certifies the issuance of the token by the manufacturer, the authenticity of the token being verifiable by the memories M1 and M2 (or more specifically by an associated control algorithm).

A field 26, for example a binary field, can indicate the state of the token which can be:
"available", i.e. not currently assigned to a function and therefore available to be assigned to a function and transferred to another memory;
"in use" i.e. currently assigned to a function and therefore neither usable for another function nor transferable.

It can also include an expiry date 22 corresponding for example to a two-year period beyond which it is no longer active or transferable. It can also have a counter 23 of the number of transfers and/or changes of assignment of functions, which can be associated with a pre-defined maximum threshold beyond which the token becomes also inactive or non-transferable.

Finally, in certain embodiments, the token can contain a timeline 24 of its use enabling the traceability and/or a reactivation of functions in the event of failure. Similarly, a field 25 memorizing the current assignment (facility and function) can be planned.

Figure 3:
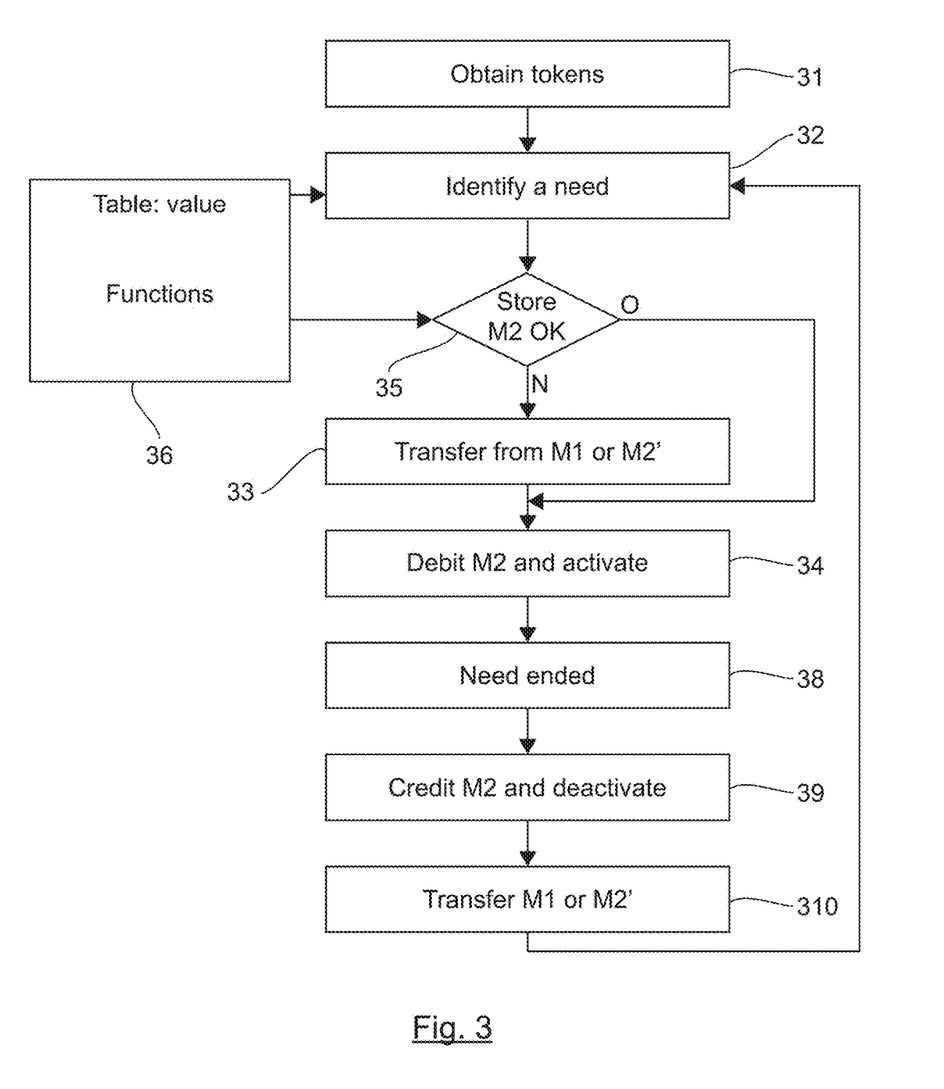
FIG. 3 is a simplified flow chart of the implementing of an embodiment of the method of the invention.

An example of a method of implementing is illustrated in a simplified way by the flow chart of FIG. 3.

Initially, the user must therefore obtain a batch of tokens (31) from a manufacturer of tools or one of its authorized representatives. This operation can for example be carried out electronically, especially through the Internet, and the user will receive a batch or a set of tokens that he has ordered directly in the memory M1 of the manager or in a memory M2, M2' of one of the control hubs. In particular, the tokens can be provided in the form of physical objects such as memories, a USB stick or a smart memory card that can communicate with the control hub, for example with contactless communication, to transfer the batch of tokens thereto. These tokens will thereby be stored in the memory of the control hub.

More generally, the exchanges of tokens between the manager and the control hub or among the control hubs can be carried out by means of:
wire links, for example:
  Ethernet;
  USB;
  RS 232;
  etc.
radio links; and/or
contactless links, for example:
  NFC;
  RFID;
  etc.

It will be noted here that a simple smartcard provided with a memory, for example an RFID label, can be a simplified manager containing a memory M1 and exchanging tokens with the memories M2 of the control hubs.

Then, the user identifies and selects the function or functions that he wishes, for each hub and/or each facility (32). Depending on this selection, the number of tokens associated with the required function or functions is debited (34) from the memory M2 of the control hub that has to activate the function. In other words, the corresponding tokens pass from the "available" state to the "in use" state. According to one variant, the tokens are transferred from a zone of the memory identified as containing available tokens to a zone identified as containing tokens in use, i.e. tokens assigned to a function.

This leads to the activation of this token and that of the selected function.

Naturally, these debit operations 34 are possible only if the required number of tokens is available in the memory M2. There is therefore an operation 35 for checking on the availability of the number of tokens, on the basis of the value in tokens of each function defined in a table 36. If this is not so, the request for activating a function is rejected. A transfer 33 of tokens can be made, from the memory M1 of the manager or a memory M2' of another control hub, so that the memory M2 has the required number of tokens (the control hub can also carry out arbitration in the allocation of its own tokens, as explained here below).

When the need for one or more functions in the hub no longer exists, or proves to be less of a priority than another function (38), the function is deactivated and then the tokens can be released and made available for the activation of another function in the memory M2. These tokens are then once again available, for another need (32). They can also be transferred (310) to the memory M1 of the manager or the memory M2' of another control hub.

The use of non-differentiated tokens thus enables great flexibility of use and of matching with functions according to user's needs at several levels.

It is important to note that, according to an exemplary embodiment of the invention, it is not imperative to have a centralized function passing through the memory M1 of a manager (arrow $F_{22}$ of FIG. 1). Indeed, it is also planned that two control hubs $12_1$ and $12_N$ can directly exchange (arrow $F_{22}$ of FIG. 1) tokens. This is why the steps 33 and 310 indicate that the exchanges can be made also with a memory M2' of another control hub. This aspect is illustrated and described in more precise detail in relation with FIGS. 5A and 5B.

Thus, there is a simple system available that can be implemented in a non-centralized way, for a speedy exchange that can be carried out by an operator between two control hubs, for example neighboring hubs, transparently for the rest of the system.

In other words, the reassignment to other functions can be done within the control hub without passing through the manager.

Figure 4:
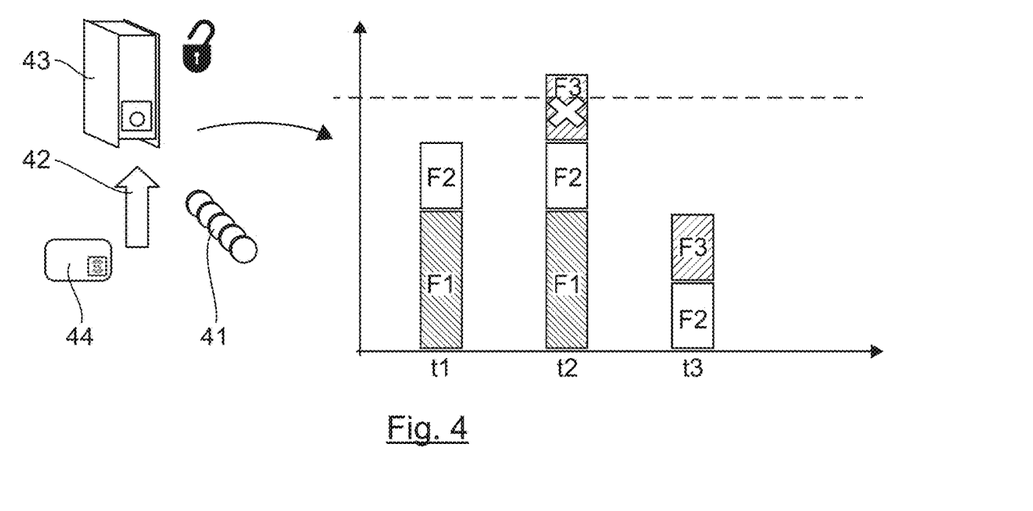
FIG. 4 illustrates the possibility of modifying the assignment of functions in a control hub.

Thus, as illustrated in FIG. 4, it is possible to manage the use of a number of tokens stored in the memory M2 of a control hub 43 without action by the manager. In this example, the user has initially (at an instant t1) activated two functions F1 and F2. At an instant t2, he wishes to activate a third function F3 and notes that this activation requires a number of tokens greater than that available in the memory M2.

In this case, he can naturally load (42) new tokens 41 contained in a card 44 provided for this purpose (or in the memory of a manager). However, he can also choose to manage the available tokens internally (in the control hub) by deactivating (if necessary temporarily) the function F1 to activate the function F3 while at the same time keeping the function F2. In this way, at the instant t3, only the functions F2 and F3 are activated.

Figure 5A:
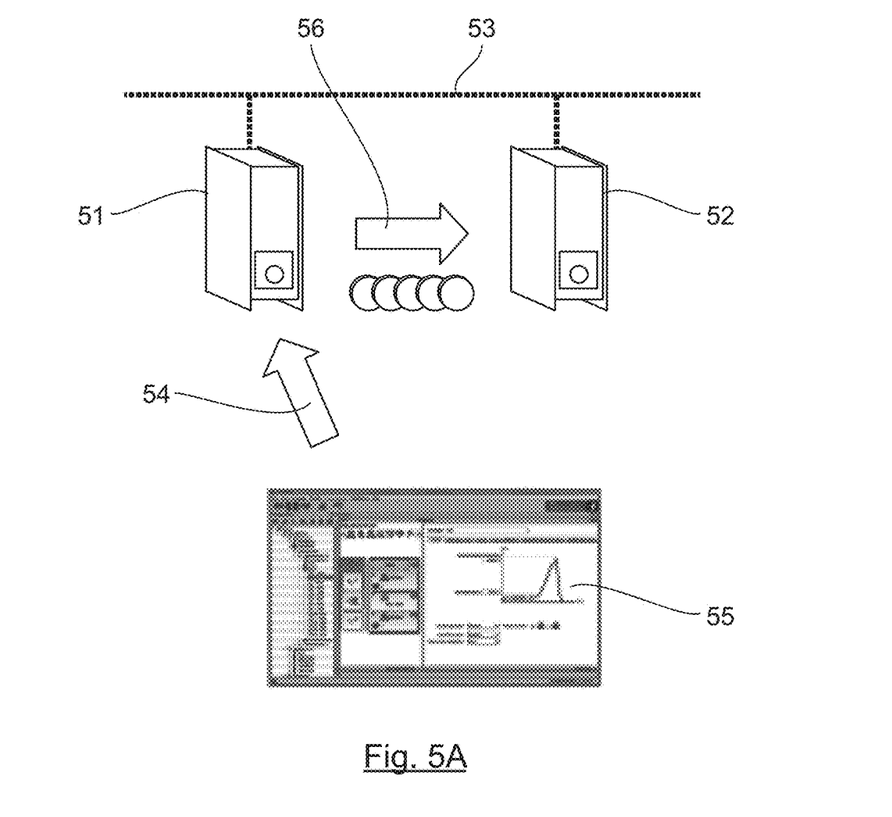
FIGS. 5A and 5B present the possibility of exchanging tokens between two control hubs.
Figure 5B:
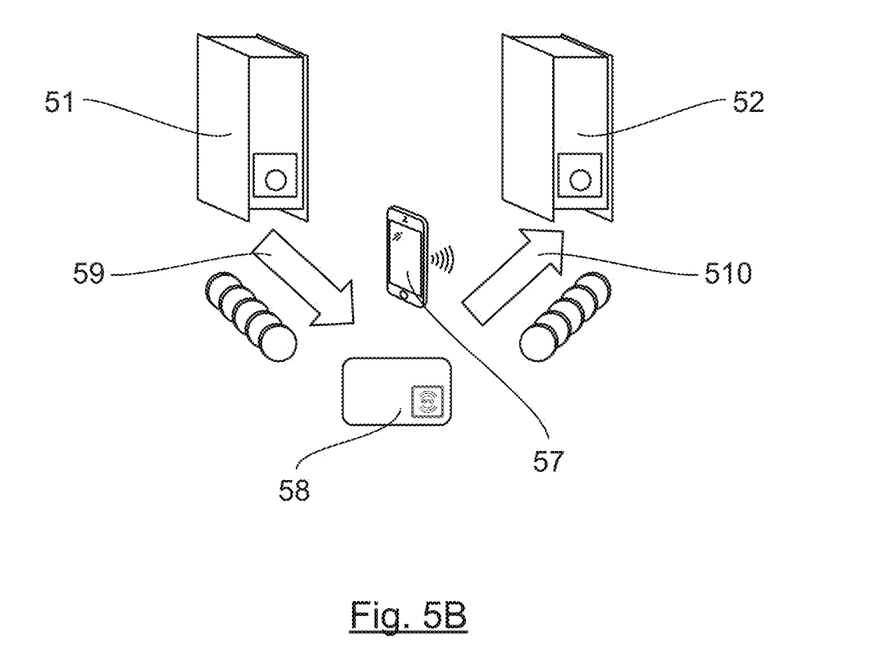

As illustrated in FIGS. 5A and 5B, it can also be envisaged to exchange tokens between two control hubs 51 and 52 according to need and reserves of tokens of each of these control hubs. In this case, the control hub transferring tokens acts as a manager.

In the embodiment of FIG. 5A, this transfer 56 of token is done via a computer network, for example Ethernet, 53, for example upon reception of a command 54 sent out by the manager 55.

As illustrated in FIG. 5B, the exchange of tokens can also be carried out via a suitable transfer support, such as a telephone or a tablet 57 or a smartcard 58 (which as the case may be can fulfill a role of a manager provided with a memory M1) capable of communicating, for example, contactlessly, and receiving (59) tokens from the first control hub 51 to transfer them (510) to the control hub 52.

Figure 6:
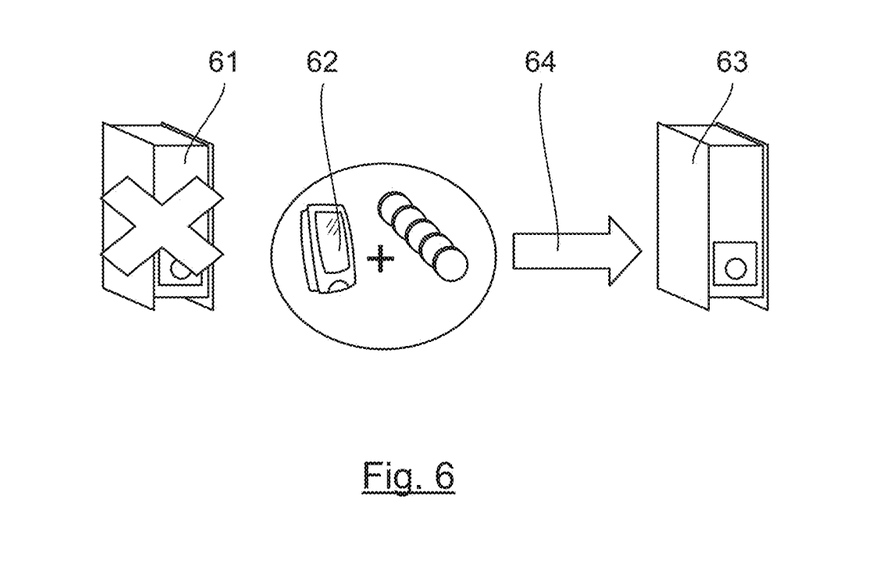
FIG. 6 illustrates the management of a case of malfunction of a control hub.

As illustrated in FIG. 6, an exemplary embodiment of the invention also makes it possible to efficiently and simply manage the failure 61 of a control hub by transferring (64) its memory M2 62 or the content of its memory M2 towards a replacement control hub 63 that will take over transparently, as regards the availability of optional functions.

A particularly simple and efficient system is thus available to manage the authorizing of the use of optional functions. Indeed, once the user has the necessary tokens available, he can assign the functions that he needs as he wishes, whether it is to test them, use them on a one-time basis for a specific need or transfer them from one tool system to another, etc.

The management is thus also simplified for the manufacturer or the supplier since he has no need to have knowledge of the functions implemented at a given point in time: he provides only non-differentiated tokens.

Since the functions are pre-installed and can be activated when the number of tokens required is present, the actions and updates are reduced. The management is also simplified because, if the user needs new functions without wanting to eliminate those he is using already, it is enough for him to procure new tokens.

The updating is also simple since the tokens can have an expiry date.

It also possible to plan for an alert mechanism, a few days or weeks in advance, to enable the user to obtain new tokens to replace those that have become obsolete.

The invention claimed is:

1. A method comprising:
    managing optional functions in a screw driving system using a fleet of at least two control hubs, each controlling at least one piece of production equipment and being capable of being used with at least one optional function, wherein managing comprises:
    storing non-differentiated tokens by each of the control hubs, wherein said at least one optional function is assigned a pre-defined weight, corresponding to a number of tokens, said at least one optional function being pre-installed and deactivated in said control hub,
    selectively activating said at least one function on said control hub, provided that the control hub has available a number of tokens greater than the weight of said function, a quantity of tokens corresponding to the weight of said function being debited from said number of tokens available to the control hub,
    wherein said at least one function can be selectively deactivated, said tokens corresponding to the weight of said function being then made freely usable,
    and wherein two of said control hubs can transfer non-differentiated tokens to each other.

2. The method for managing functions according to claim 1, wherein at least one device for managing said fleet of control hubs has available a first storage memory capable of storing non-differentiated tokens,
    and wherein each of said control hubs is associated with a second memory for the storage of tokens, which is capable of exchanging tokens with said first electronic memory and with said second memory of another control hub.

3. The method for managing functions according to claim 2, wherein said device belongs to the group consisting of:
    industrial automatons;
    servers;
    computers;
    memory cards;
    tablets;
    USB sticks;
    control hubs.

4. The method for managing functions according to claim 1, wherein said functions comprise functions of programming and/or sequencing a screw driving operation.

5. The method for managing functions according to claim 1, wherein said functions belong to the group consisting of:
    the activation of at least one piece of production equipment;
    screw driving strategies defining a sequencing of steps, each defined by a value of torque, a speed and/or a screw driving angle;
    the maximum numbers of steps for a screw driving strategy;
    the maximum number of screw driving strategies available;
    at least one sequencing of a set of screw driving operations;
    at least one screw driving synchronization between at least two screw driving tools;
    the operations of traceability of a screw driving operation and/or a set of screw driving operations;
    the operations of analysis and/or control of a screw driving operation and/or a set of screw driving operations;
    the modifications of the capacity of memory storage;
    the customizing of a specific communications protocol.

6. The method for managing functions according to claim 1, comprising activating one of said functions by an operator using a man/machine interface of the control hub.

7. The method for managing functions according to claim 2, wherein said control hub enabling an activation of one of said functions by said managing device.

8. The method for managing functions according to claim 2, comprising performing said transfer of tokens between said at least one managing device carrying said first electronic memory and at least one control hub carrying said second electronic memory using a wire, radio and/or contactless link.

9. The method for managing functions according to claim 1, comprising performing said transfer of tokens between at least one first control hub carrying an electronic memory ($M2_1$) and at least one second control hub carrying another electronic memory, via a wire, radio and/or contactless link.

10. The method for managing functions according to claim 1, comprising detaching said second memory associated with a given control hub and mounting said second memory on a replacement control hub in the event of malfunction or failure of said given control hub.

11. The method for managing functions according to claim 1, wherein each of said tokens bears an expiry date and/or a maximum duration of use beyond which it becomes of no value.

12. The method for managing functions according to claim 1, wherein each of said tokens bears a transfer-restraining date and/or a maximum number of transfers beyond which it can no longer be transferred.

13. The method for managing functions according to claim 1, further comprising storing, in a centralized management unit, a table allocating tokens to each of said control hubs and/or to each of said functions and/or assigning an availability of tokens in each of said control hubs.

14. A screw driving system comprising:
a fleet of at least two control hubs, each controlling at least one piece of production equipment and being capable of being used with at least one optional function,
wherein each of said control hubs stores non-differentiated tokens,
wherein said at least one optional function is assigned a pre-defined weight corresponding to a number of tokens, said at least one optional function being pre-installed and deactivated in said control hub,
wherein said at least one function is selectively activatable on said control hub provided that the control hub has available a number of tokens greater than the weight of said function, the tokens corresponding to the weight of said function being debited from the number of tokens available to the control hub,
wherein said at least one function is selectively deactivatable, said tokens corresponding to the weight of said function being then made freely usable, and
wherein two of said control hubs are configured to enable transfer of said tokens to each other.

15. A control hub of a screw driving system according to claim 14, wherein the control hub comprises means for activating/deactivating said optional functions, wherein the activation or deactivation debits or credits, respectively, said second storage memory with tokens.

16. The control hub according to claim 15, wherein the control hub is associated with a second memory for storage of tokens and comprises means for managing tokens capable of exchanging tokens with a first electronic memory of a managing device of said fleet of control hubs and with said second memory of another control hub.

17. A non-transitory computer-readable medium comprising program code instructions stored thereon for implementing a method of managing optional functions in a screw driving system when the instructions are executed by a computer of the system, wherein the screw driving system uses a fleet of at least two control hubs, each controlling at least one piece of production equipment and being capable of being used with at least one optional function, wherein the method of managing comprises:
storing non-differentiated tokens by each of the control hubs, wherein said at least one optional function is assigned a pre-defined weight, corresponding to a number of tokens, said at least one optional function being pre-installed and deactivated in said control hub,
selectively activating said at least one function on said control hub, provided that the control hub has available a number of tokens greater than the weight of said function, a quantity of tokens corresponding to the weight of said function being debited from said number of tokens available to the control hub,
wherein said at least one function can be selectively deactivated, said tokens corresponding to the weight of said function being then made freely usable,
and wherein two of said control hubs can transfer non-differentiated tokens to each other.

* * * * *